US 8,107,102 B2

(12) United States Patent
Funahashi (10) Patent No.: US 8,107,102 B2
(45) Date of Patent: Jan. 31, 2012

(54) PRINTER CONTROLLER AND COMPUTER READABLE MEDIUM FOR USE IN AUTHENTICATION OF PRINTING BY PRINTER

(75) Inventor: Norimichi Funahashi, Nisshin (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1131 days.

(21) Appl. No.: 11/925,087

(22) Filed: Oct. 26, 2007

(65) Prior Publication Data

US 2008/0100863 A1 May 1, 2008

(30) Foreign Application Priority Data

Oct. 30, 2006 (JP) ................... 2006-294722

(51) Int. Cl.
*G06K 15/00* (2006.01)
*G03G 15/00* (2006.01)
*G03G 21/02* (2006.01)
*G06F 3/12* (2006.01)
(52) U.S. Cl. ........... 358/1.14; 358/1.15; 399/79; 399/80
(58) Field of Classification Search ................. 358/1.14, 358/1.15; 399/79, 80
See application file for complete search history.

(56) References Cited

U.S. PATENT DOCUMENTS 7,869,077 B2 *   1/2011  Ohara et al. ................. 358/1.16
2002/0145748 A1  10/2002 Nonoyama et al.
2005/0195425 A1 *  9/2005  Bridges et al. ............... 358/1.15
2006/0187481 A1 *  8/2006  Hayakawa .................... 358/1.14
2008/0068642 A1 *  3/2008  Takahashi .................... 358/1.15

FOREIGN PATENT DOCUMENTS

| JP | 2001-105690 | 4/2001 |
| JP | 2002-140184 | 5/2002 |
| JP | 2002-196900 | 7/2002 |
| JP | 2002-240398 | 8/2002 |
| JP | 2003-015828 | 1/2003 |
| JP | 2005-352784 | 12/2005 |
| JP | 2006-209196 | 8/2006 |
| JP | 2006-293933 | 10/2006 |

OTHER PUBLICATIONS

Japanese Office Action, Reference No. PBR03077, Mailing Date Oct. 21, 2008.

* cited by examiner

*Primary Examiner* — Charlotte M Baker
*Assistant Examiner* — Fred Guillermety
(74) *Attorney, Agent, or Firm* — Banner & Witcoff, Ltd.

(57) ABSTRACT

A printer controller includes: a selecting unit that selects authentication information from among a plurality of authentication information; a first transmitting unit that transmits the authentication information selected by the selecting unit to a printer connected to the printer controller via a network; and a second transmitting unit that transmits print data to be printed to the printer. The authentication information selected by the selecting unit is used for authentication for allowing the printer to print an image based on the print data.

24 Claims, 6 Drawing Sheets

PRINTER CONTROLLER AND COMPUTER READABLE MEDIUM FOR USE IN AUTHENTICATION OF PRINTING BY PRINTER

CROSS-REFERENCE TO RELATED APPLICATION

This application claims priority from Japanese Patent Application No. 2006-294722, filed on Oct. 30, 2006, the entire subject matter of which is incorporated herein by reference.

TECHNICAL FIELD

Aspects of the present invention relate to a printer controller that transmits data to be printed to a printer connected via a network, a computer program product embodied on a recording medium that causes operations of the printer controller, and a printer connectable to the network.

BACKGROUND

A printer controller transmits data to be printed (print data) to a printer connected via a network. When such a printer controller is used, the print data can be transmitted to and printed by a printer installed apart from the printer controller via a network.

For print data such as confidential documents, etc. in this type of printer controller, various modes have been proposed in which no printing is enabled unless data for required authentication are inputted to the printer.

For example, JP-A-2001-105690 discloses a technique wherein a printer sets an ID and a password and informs a printer controller (for example, a personal computer) from which a print data is transmitted. And when the ID and password are inputted to the printer, printing the print data is permitted.

JP-A-2002-240398 discloses a technique wherein a plurality of user IDs is registered as a group ID in an ID card. When the ID card having the group ID stored therein is inserted into a printer, printing the print data which is to be printed by the group is permitted.

SUMMARY

However, in an apparatus described in JP-A-2001-105690, no one other than a user of the printer controller from which the print data is transmitted, can print the printing data. Thus, the apparatus is not suitable for a case where information materials for a meeting are distributed to a number of persons. On the other hand, in the apparatus described in JP-A-2002-240398, if an ID card in which the group ID is stored is handed to a plurality of persons in advance, all of the persons are able to print the print data. However, it is necessary that, whenever the group ID is set, the ID card in which the group ID is stored is handed over to the persons to which the information materials are to be distributed. Therefore, the convenience also is not favorable.

Aspects of the present invention relate to the above problem. According to at least one aspect of the present invention, a printer controller may be provided that is capable of promptly selecting persons, who are permitted to print the print data, for each of print data, and is capable of facilitating processes to cause the persons to print the print data.

According to an aspect of the present invention, a printer controller includes: a selecting unit that selects authentication information from among a plurality of authentication information; a first transmitting unit that transmits the authentication information selected by the selecting unit to a printer connected to the printer controller via a network; and a second transmitting unit that transmits print data to be printed to the printer. The authentication information selected by the selecting unit is used for authentication for allowing the printer to print an image based on the print data.

DETAILED DESCRIPTION

[Overall Configuration of the Print System]

Figure 1:
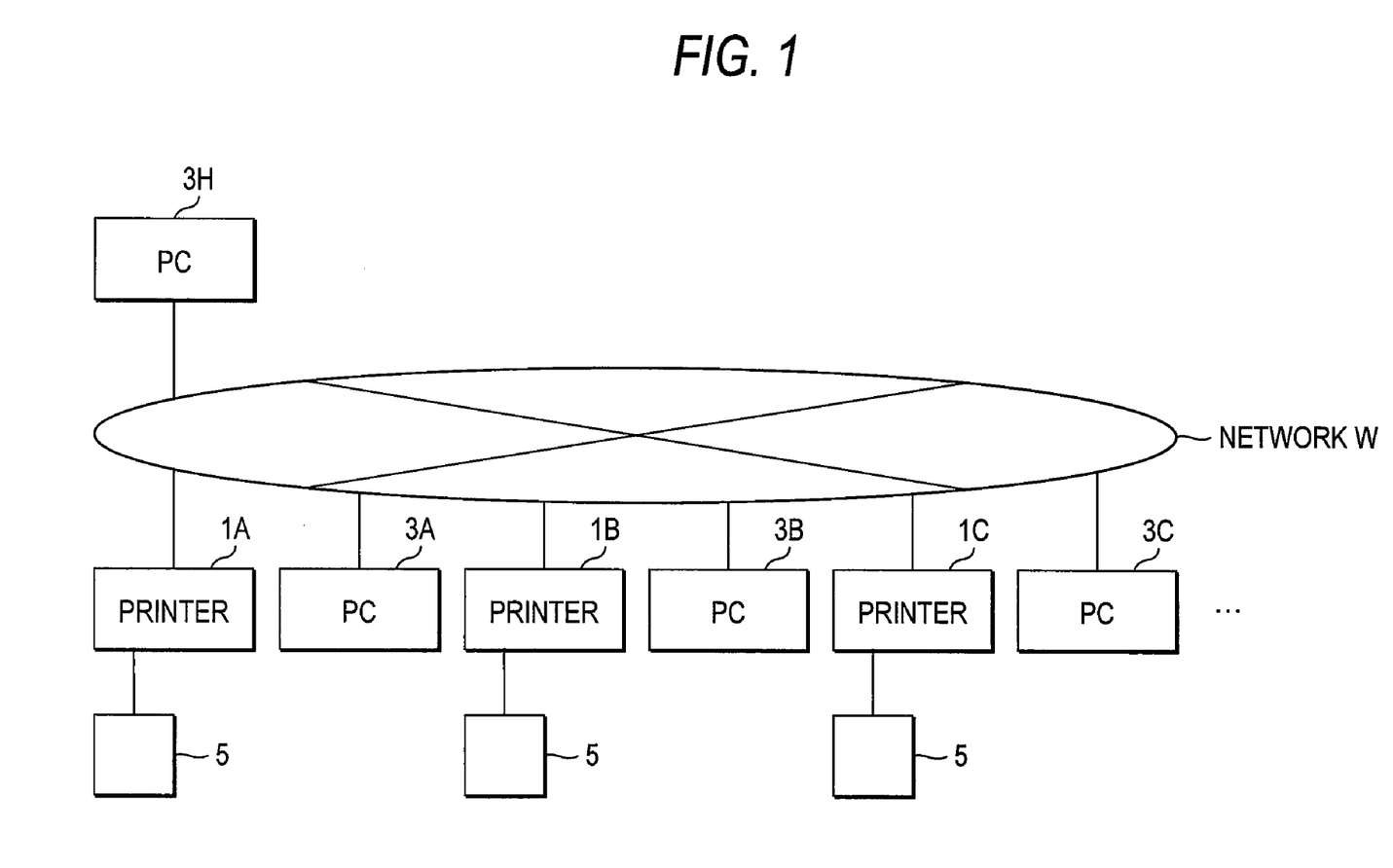
FIG. 1 is a schematic view describing the entire configuration of a print system according to an embodiment of the present invention.

A description is given of embodiments of the present invention with reference to the drawings. FIG. 1 is a schematic view expressing the entire configuration of a print system according to an embodiment of the present invention. As shown in FIG. 1, the print system includes printers 1A, 1B, 1C personal computers used by individual users (hereinafter, referred to as "PC") 3A, 3B, 3C . . . , a PC 3H used by an administrator and a network connecting them with each other. The network may be any network such as a local area network, the Internet, etc.

The printers 1A, 1B, 1C are disposed at the positions close to the PCs 3A, 3B, 3C, respectively. TO the printers 1A, 1B, 1C, card readers 5 that can read data (card ID) of ID cards owned by users in a non-contacted state is connected. In the following description, when there is no need to specially distinguish, the PCs 3A, 3B, 3C and the PC 3H are merely called "PCs 3," and the printers 1A, 1B and 1C are merely called "printers 1."

[Configuration of the Control System of Print System]

Figure 2:
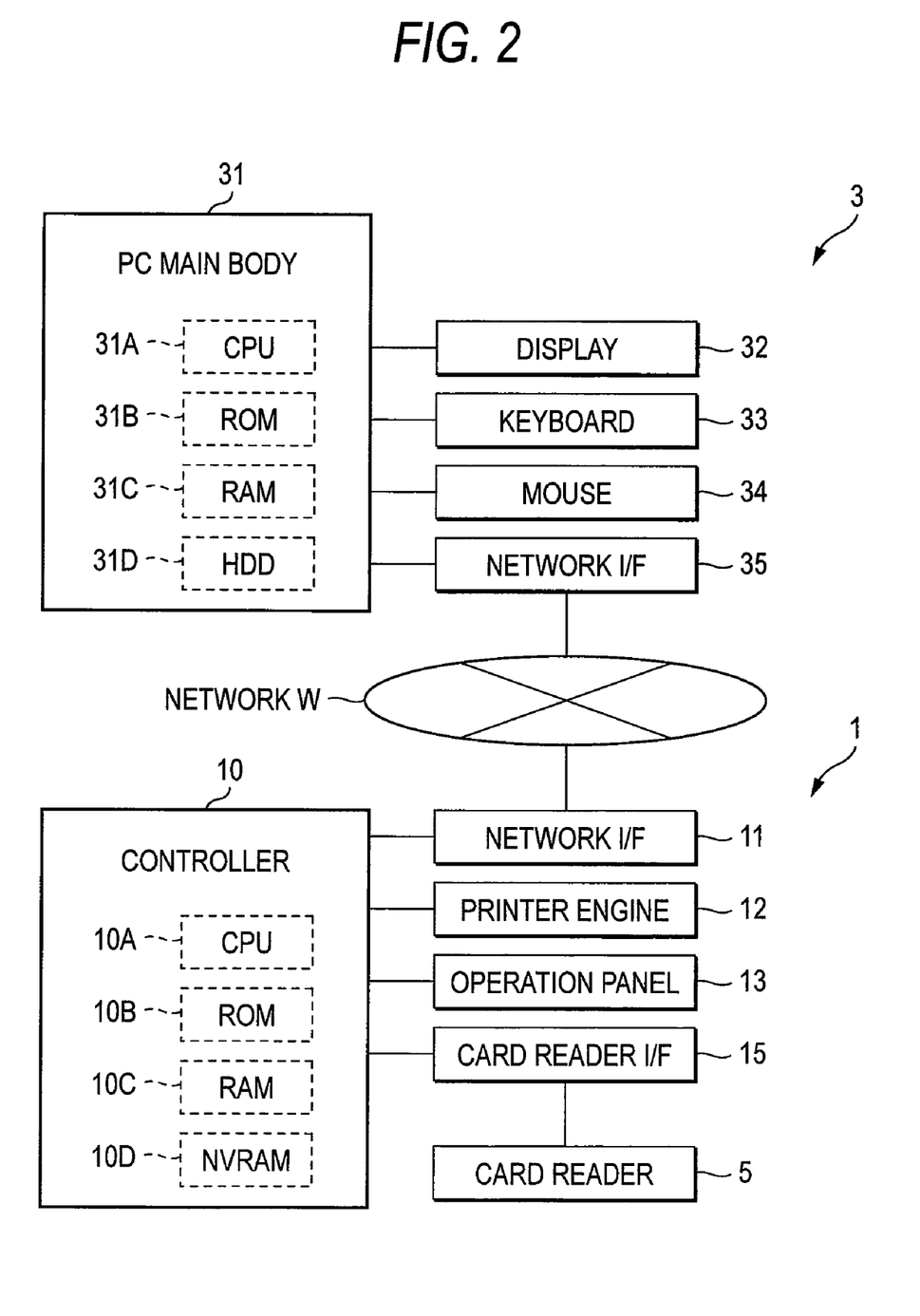
FIG. 2 is a block diagram showing a configuration of a control system in the print system.

FIG. 2 is a block diagram describing a configuration of a control system in the print system. Each printer 1 includes a publicly known printer engine 12 (printing unit) therein. The printer engine 12 forms an image with toners of yellow, magenta, cyan and black using an electronic photography system. As shown in FIG. 2, a controller 10 is provided to control the printer engine 12. The controller 10 is composed as a microcomputer including a CPU 10A, a ROM 10B, and a RAM 10C. Further, the controller 10 includes a NVRAM 10D so that the memory is not lost even when the power switch is turned off. In addition to the printer engine 12 described above, the controller 10 is connected to a network port interface (network port I/F) 11 (first receiving unit, second receiving unit) for connection to the PCs 3 via the network W, an operation panel 13 as an input unit which enables various types of inputs to the printer 1, and a card reader interface (card reader I/F) 15 (the authentication information input unit) for connection to the card reader 5.

Each of the PCs 3 includes a PC main body 31. The PC main body 31 includes a CPU 31A, a ROM 31B, a RAM 31C and a hard disk device (HDD) 31D (computer readable medium). And, a display 32 such as a CRT, a keyboard 33 as an input unit, and a mouse 34 are connected to each of the PC main bodies 31. Further, a network port interface (network I/F) 35, etc., for connection with the controller 10 of the printer 1 via the network W is connected to each of the PC main body 31.

[Control in the Print System]

Figure 3:
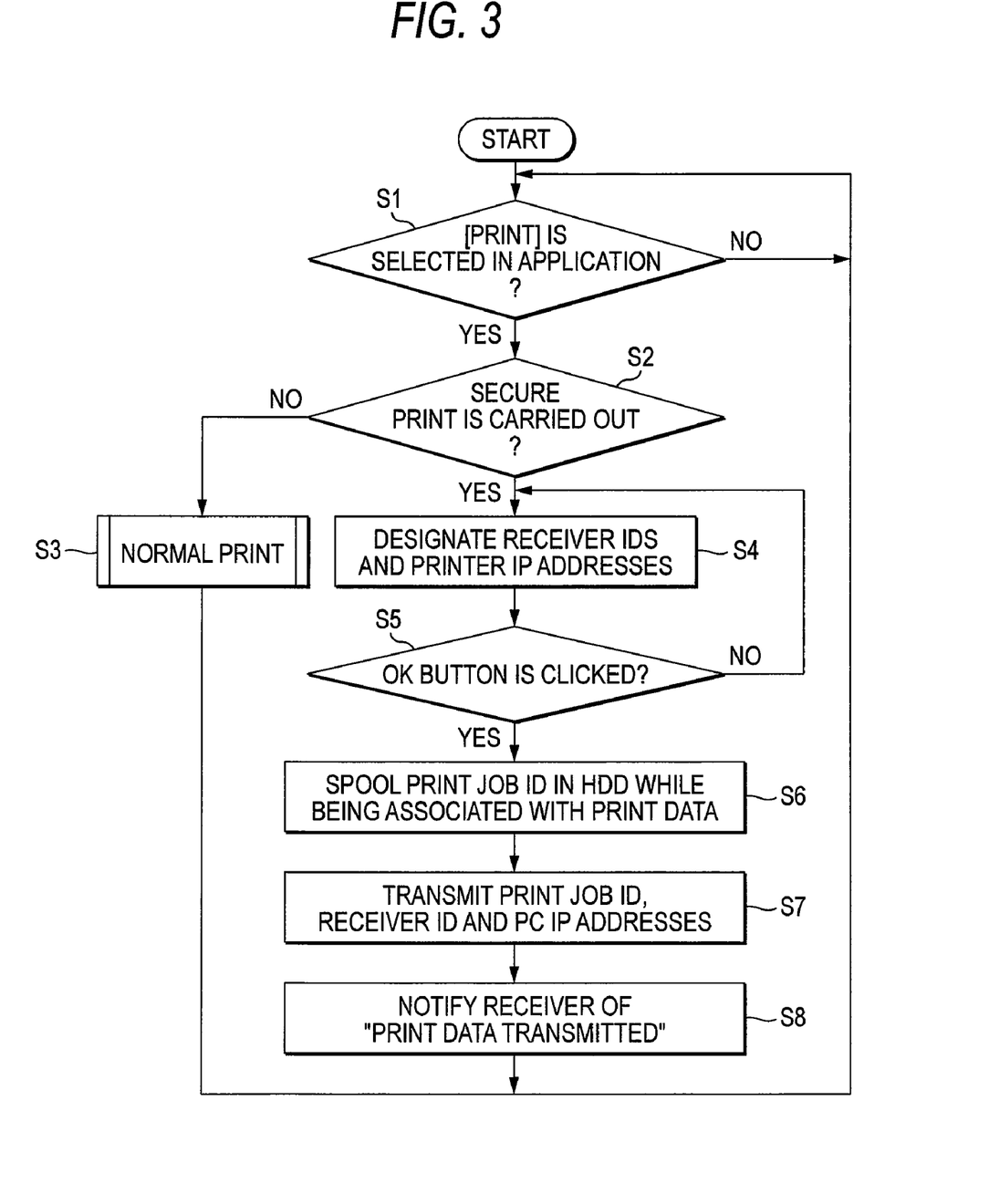
FIG. 3 is a flowchart showing print data spool process which are carried out by PCs of the control system.

Next, a description is given of a process to be carried out by the control system. FIG. 3 is a flowchart describing a print data spool process carried out by the PC 3H. Also, the process is repeatedly carried out in time-sharing manner when the PC 3H is started.

In the process as shown in FIG. 3, first, it is determined in S1 (S means a step: this is the same in the following description) whether a command [PRINT] is selected on the user interface displayed on the display 32 during an application being executed in the PC 3H. When [PRINT] is not selected (S1: N), the process stands by in S1 as it is, and when [PRINT] is selected (S1: Y), the process shifts to S2. In S2, with respect to the command [PRINT], it is determined whether or not execution of secure print (that is, printing of confidential documents) is instructed. And, if the execution of secure print is not instructed (S2: N), a normal printing process in which print data is transmitted to a designated printer 1 as usual is carried out in S3, and the process shifts to S1 described above.

When execution of the secure print is instructed (S2: Y), the process shifts to S4 (selecting unit) wherein a receiver ID and a printer IP address is designated with the operation of the keyboard 33 and/or mouse 34. Specifically, a receiver ID list as illustrated in Table 1 below is stored in the HDD 31D (first, second and third storage units) of the PC main body 31.

TABLE 1

| Name | Receiver ID | E-mail address | Nearest printer IP address |
|---|---|---|---|
| Taro Yamada | BR01234 | taro@abcde.co.jp | 10.136.45.052 |
| Hanako Suzuki | BR34567 | hanako@abcde.co.jp | 10.136.45.070 |
| Ichiro Sato | BR87654 | ichiro@abcde.co.jp | 10.136.45.083 |
| ... | ... | ... | ... |
| ... | ... | ... | ... |
| ... | ... | ... | ... |
| ... | ... | ... | ... |
| ... | ... | ... | ... |

As illustrated in Table 1, the names of users of the PCs 3, receiver IDs serving as an authentication information corresponding to the card IDs stored in the ID cards owned by the users, E-mail addresses of the PCs 3 of the respective users, and the printer IP addresses of the printers 1 close to the PCs 3 are associated with each other and stored in the receiver ID list. In the process of S4, the receiver ID and printer IP address are designated based on the receiver ID list being displayed on the display 32 and which name is clicked etc. Note that the receiver ID list may be stored in another apparatus (server etc.) connected to the network W. In this case, each of the PC does not have to store the receiver ID list.

When designation of such a receiver ID and a printer IP address is finished, the administrator of the PC 3H clicks the OK button (ENTER button) of the user interface displayed on the display 32. That is, in S5 after S4, it is determined whether the OK button is clicked. And, when not clicked (S5: N), the process shifts to S4 again, and when the OK button is clicked (S5: Y), the process shifts to S6.

In S6, print job ID of a print job and the print data for which printing is instructed in S1 are associated with each other and are spooled in the HDD 31D. In subsequent S7 (first transmitting unit), the print job ID, the receiver ID designated in S4, and the IP address of the present PC (in this case, PC 3H) are transmitted to the printer 1 of the printer IP address designated in S4. In subsequent S8 (second message transmitting unit), an e-mail (second message) to inform [PRINT DATA ALREADY TRANSMITTED] is transmitted to the e-mail address associated with the receiver ID designated in S4 with reference to the receiver ID list. And, after the process is finished, the process shifts to S1 described above.

If such a notice of [PRINT DATA ALREADY TRANSMITTED] is transmitted as an e-mail, the user of the PC 3 to which the e-mail has been transmitted is able to know that printing of confidential documents such as, for example, information materials for a meeting is enabled. In this case, the user who received the e-mail holds his ID card over the card reader 5 connected to the close printer 1, and causes the card reader 5 to read the card ID as authentication data stored in the ID card.

Figure 4:
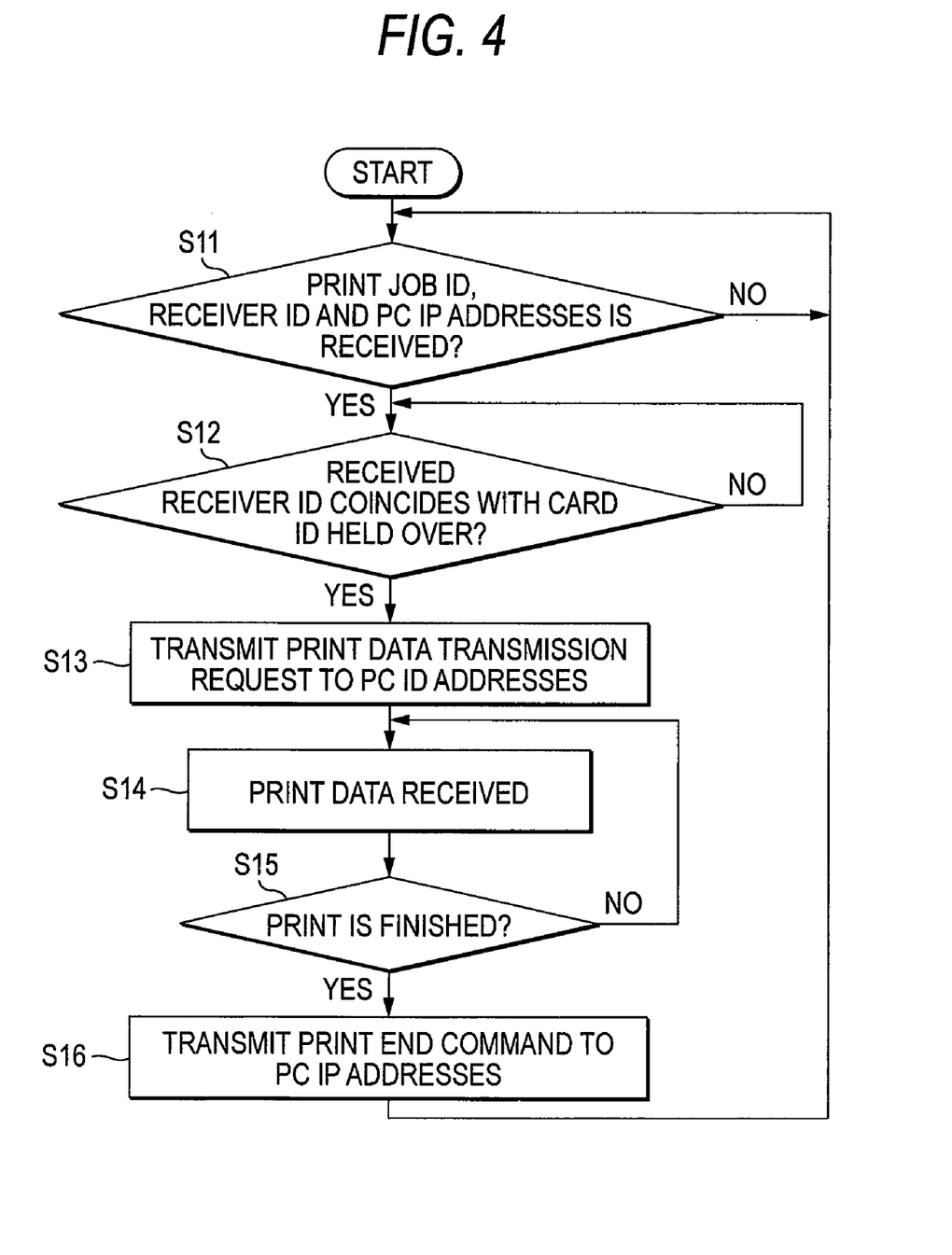
FIG. 4 is flowchart showing a print process which is carried out by a printer of the control system.

Next, a description is given of a process of the printer 1 responsive to the operations. FIG. 4 is a flowchart describing the printing process in each of the printers 1. Also, this process is repeatedly executed after the power of the printer 1 is turned on.

In this process as shown in FIG. 4, first, it is determined in S11 whether the print job ID, receiver ID, and IP address of the PC are received. When they are not received (S11: N), the process stands by in S11, and when they are received (S11: Y), the process subsequently shifts to S12. In S12, the card ID is read from the ID card held over the card reader 5, and it is determined whether the read card ID coincides with the receiver ID received. When the ID card is not held thereover or where the receiver ID does not coincide with the card ID (S12: N), the process stands by in S12. When they coincide with each other (S12: Y), the process shifts to subsequent S13. In S13 (transmitting unit), a transmission request of print data (first information) corresponding to the received print job ID is transmitted to the received IP address of the PC (in this case, the PC 3H).

Figure 5:
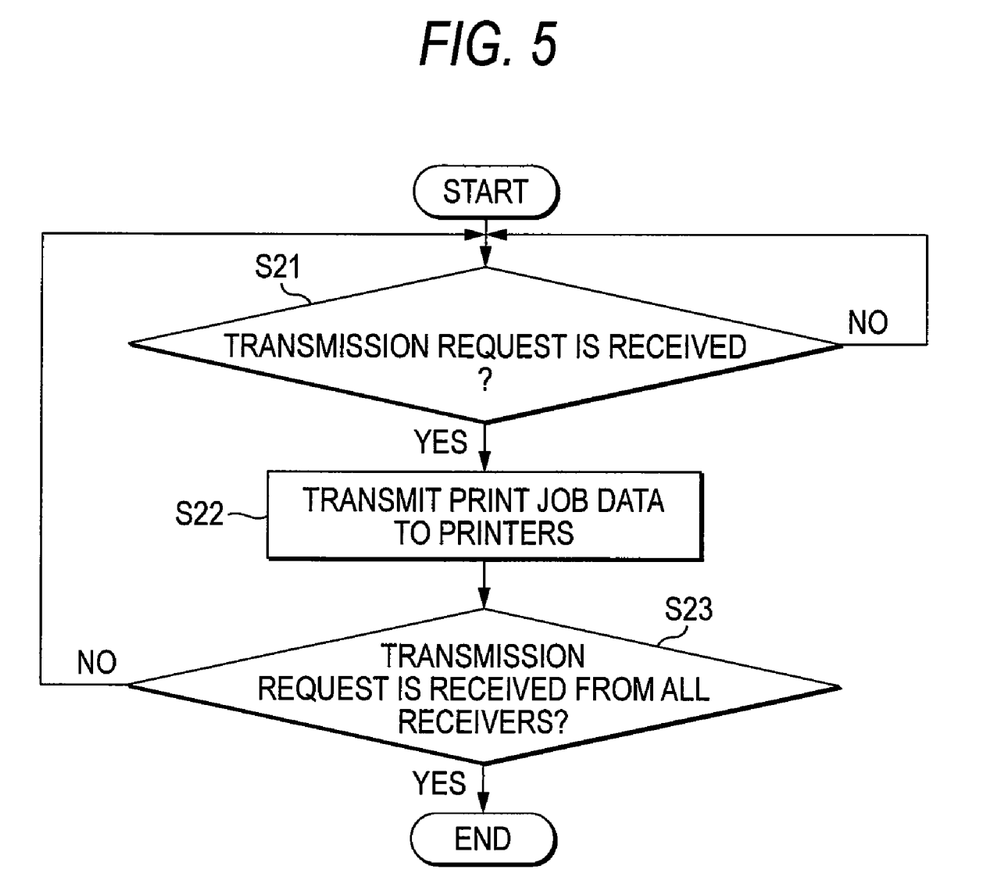
FIG. 5 is a flowchart showing a print data transmission process carried out by the PCs.

In response to the process, print data transmission processes are repeatedly carried out in the PC 3H as shown in FIG. 5. Also, the process is individually carried out for each of the print job IDs when the print job IDs are transmitted in S7 described above.

In this process as shown in FIG. 5, it is first determined in S21 whether a transmission request of print data corresponding to the print job ID is received from the printer 1. When not received (S21: N), the process stands by in S21. When received (S21: Y), the process shifts to S22. In S22 (second transmitting unit), the print data corresponding to the print job ID is transmitted to the printer 1 from which the transmission request is transmitted. In subsequent S23, it is determined whether the transmission request is received from all the receivers of the e-mail transmitted in S8. And, when the transmission request is not received from all the receivers (S23: N), the process shifts to S21 described above. When the transmission request is received from all the receivers (S23: Y), the process ends.

Returning to FIG. 4, after the transmission request is transmitted in S13, the print data corresponding to the print job ID, which is transmitted from the PC 3H, is received in S14 in the printer 1. When the print data is received, printing is executed via the printer engine 12 by a predetermined process (not illustrated). Then, in subsequent S15, it is determined whether the printing is finished. When the printing is not finished (S15: N), the process shifts to S14 described above. On the other hand, when the printing has finished (S16: Y), the process shifts to subsequent S16, wherein a print end command is transmitted to the received IP address of the PC (in this case, PC 3H), and the process shifts to S11 described above.

In addition, during standby in S11 or S12, if general print data, which is not instructed as the secure print, is transmitted to the printer 1, the print data is printed by an interruption process in the printer 1. In this case, the sheet direction such as longitudinal setting or lateral setting and type of sheet such as recycled paper or wood-free paper may be made different by differing the sheet feeding tray from that used for execution of the secure print in S14, it may be possible to easily distinguish to which print data the printing corresponds.

Figure 6:
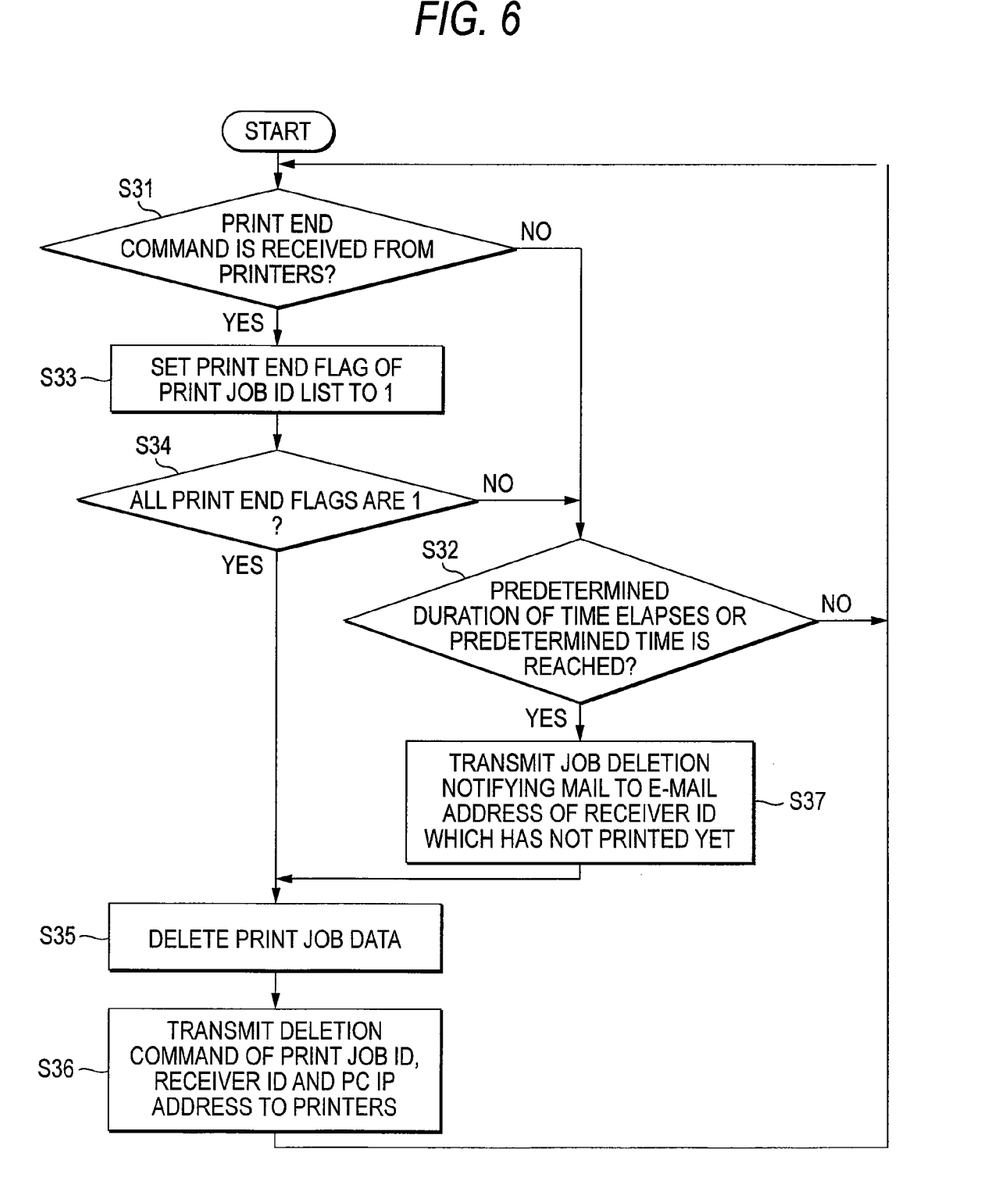
FIG. 6 is a flowchart showing a print job deletion process carried out by the PCs.

Next, a description is given of a print job deleting process that is executed by the PC 3H in response to the print end command transmitted in S16 described above. FIG. 6 is a flowchart describing the print job deleting process. The process is repeatedly carried out in time-sharing manner when the print job ID is transmitted in S7 described above.

In the process as shown in FIG. 6, it is determined in S31 whether the print end command is received from the printer 1. When not received (S31: N), the process shifts to S32. In S32, it is determined whether a predetermined duration of time elapses since the print job ID, etc., was transmitted in S7 described above or a predetermined time (for example, planned time at which a meeting ends in case where the meeting information materials are printed by the secure print) is reached. If the predetermined duration of time does not elapse or the predetermined time is not reached (S32: N), the process shifts to S31 described above. When the print job deleting process starts, usually, a loop process of S31 and S32 are repeatedly executed.

When a print end command is received from any one of the printers 1 during the loop process (S31: Y), the process shifts to S33, and the print job end flag of the print job ID list is set to 1. Specifically, print job ID lists illustrated in Table 2 below are stored in the HDD 31D of the PC main body 31.

TABLE 2

| Print Job ID | Receiver ID | Printer IP address | Print end flag |
|---|---|---|---|
| PRN0001 | BR01234 | 10.136.45.052 | 0 (not printed) |
| PRN0001 | BR34567 | 10.136.45.070 | 1 (printing ends) |
| PRN0001 | BR87654 | 10.136.45.083 | 0 (not printed) |
| PRN0002 | BR02345 | 10.136.45.013 | 0 (not printed) |
| PRN0002 | BR67830 | 10.136.45.035 | 1 (printing ends) |
| PRN0002 | BR53429 | 10.136.45.058 | 1 (printing ends) |
| : | : | : | : |
| : | : | : | : |
| : | : | : | : |
| : | : | : | : |
| : | : | : | : |
| : | : | : | : |

As illustrated in Table 2, print job IDs of respective print data spooled in the HDD 31D, receiver IDs and printer IP addresses for the print job IDs, and print end flags are associated with each other and stored in the print job ID list. Although the default of the print end flag is 0 that expresses "not printed yet," the print end flag corresponding to the print job ID and receiver ID, which are designated by the print end command described above, is changed to 1, which expresses print end, in S33.

In S34 that comes after S33, it is determined whether all the print end flags corresponding to the print job IDs are changed into 1. When all are changed into 1 (S34: Y), the process shifts to subsequent S35, and when not changed into 1 (S34: N), the process shifts back to S32 described above.

In S35 (first deleting unit, second deleting unit), the print data corresponding to the print job ID are deleted from the HDD 31D. In subsequent S36, a command for deleting the print job ID, receiver ID, and PC IP address which are transmitted in S7 described above, is transmitted to the respective printers 1, and the process shifts to S31 described above.

On the other hand, when the predetermined duration of time elapses or the predetermined time is reached (S32: Y) although all the print end flags are not changed into 1 (S34: N), the process shifts to S37. In S37 (first message transmitting unit), an e-mail address associated with a receiver ID of which the print end flag is 0 is read from the receiver ID list, and a job deletion notifying mail (first message of notifying deletion of a job) is transmitted to the e-mail address. And, after the process is finished, the process shifts to S35 described above.

[Effect of the Embodiment]

As described above, in the present embodiment, a user of the PC 3 for which printing of print data corresponding to the respective print job IDs is permitted may be appropriately selected (S4). Also, the selected user only holds his ID card over the card reader 5 connected to the close printer 1, and may print the print data (S12 through S15). Furthermore, since an e-mail notifying that "Print Data Transmitted" is transmitted to the PC 3 of the selected user (S8), the respective users can quickly know, without causing other persons to know the same, that printing of print data by the secure print is enabled.

Also, as described above, when the print data is deleted by elapse of the predetermined duration of time or the predetermined time being reached (S32: Y), since a job deletion notifying mail is transmitted to a user who has not printed among the selected users, the user may make a response by making an inquiry to the administrator of the PC 3H.

Also, the present invention is not limited to the above embodiments but may be embodied in various modes without departing from the spirit and scope of the present invention. For example, although a description was given, as an example, of a case where print data is transmitted from the PC 3H to other PCs 3A, 3B, 3C . . . , the PCs 3A, 3B, 3C, . . . also enable the processes similar to those carried out by the PC 3H. In addition, the receiver ID is not necessarily a card ID. For example, the receiver ID may be such that can be turned into a card ID through predetermined conversion. Further, authentication data of the card ID, etc., may be inputted by, for example, using the ten keys of the operation panel 13 of the printer 1. In this case, the authentication data may be a password notified from the PC 3H. Further, the authentication data may be biometrics data of users such as finger print data etc. In this case, the user only touches an input device of finger print to print the print data. Still further, the quantity of the printer 1 connected to the network W may be single.

Also, the print data may be transmitted in advance to respective printers 1 along with the receiver IDs. In this case, it is possible to shorten the time from holding an ID card over a card reader 5 to termination of printing. However, as in the above-described embodiment, where print data is transmitted in response to a transmission request (refer to FIG. 5), it is possible to further favorably prevent the print data from leaking. Furthermore, in the above-described embodiment, where a print end command is received in regard to all the receiver IDs of the print job ID list (S34: Y) and where a predetermined duration of time elapses since transmission of the print job ID or predetermined time is reached (S32: Y), the print data is deleted (S35). Therefore, the print data can be further favorably prevented from leaking. Further, in the above-described embodiment, since a printer 1 that can print the print data is determined for each of the users of the PCs 3, the print data can be still further favorably prevented from leaking.

The present invention provides illustrative non-limiting embodiments as follows:

A printer controller includes: a selecting unit that selects authentication information from among a plurality of authentication information; a first transmitting unit that transmits the authentication information selected by the selecting unit to a printer connected to the printer controller via a network; and a second transmitting unit that transmits print data to be printed to the printer. The authentication information selected by the selecting unit is used for authentication for allowing the printer to print an image based on the print data.

According to the above configuration, the first transmitting unit transmits the authentication information used for authentication which allows the printer to print an image based on the print data transmitted by the second transmitting unit, to a printer connected via a network. And, the authentication information transmitted by the second transmitting unit may be selected by the selecting unit.

Thus, appropriate selection of persons who are permitted to print an image based on the print data for each of print data is carried out by appropriately selecting the authentication information. Further, when, for example, data allotted to respective persons described above is used as the authentication information, all the persons are able to print the print data without any special processing for the respective persons described above.

The printer controller may further include a receiving unit that receives, from the printer, first information indicating that data corresponding to the authentication information transmitted from the first transmitting unit is inputted. The second transmitting unit may transmit the print data to the printer when the receiving unit receives the first information. In this case, when the printer recognizes data corresponding to the authentication information, and transmits, to the printer controller, the first information, the second transmitting unit of the printer controller transmits the print data to the printer. That is, the print data may be transmitted to the printer simultaneously with the authentication information. However, when the print data is transmitted to the printer only when appropriate data is inputted to the printer, it is possible to further favorably prevent the print data from leaking.

The printer controller may further include: a first storage unit that stores the print data to be transmitted by the second transmitting unit; and a first deleting unit that deletes the print data from the first storage unit when the receiving unit receives first information with respect to all of authentication information transmitted from the first transmitting unit. In this case, since the print data is deleted when all the persons permitted to print the print data finish printing, it is possible to further favorably prevent the print data from leaking.

The printer controller may further include: a first storage unit that stores the print data to be transmitted by the second transmitting unit; and a first deleting unit that deletes the print data from the first storage unit after the receiving unit receives the first information with respect to the authentication information.

The printer controller may further include: a first storage unit that stores the print data to be transmitted by the second transmitting unit; and a second deleting unit that deletes the print data from the first storage unit when a predetermined time has elapsed after the first transmitting unit transmits the authentication information. In this case, since the print data is deleted after the predetermined time has elapsed after the authentication information is transmitted, it is possible to further favorably prevent the print data from leaking.

The printer controller may further include: a second storage unit that stores an address associated with authentication information; and a first message transmitting unit that, when the predetermined time has elapsed after the first transmitting unit transmits the authentication information and when the receiving unit has not received yet the first information form the printer, transmits a first message to an address associated with the authentication information transmitted to the printer from which the receiving unit has not received yet the first information. In this case, it is possible to transmit the first message to a person who does not finish printing although the printing of the print data is permitted when the print data is deleted after the above-described predetermined time elapses, in order to inform the person of the same. If so, the person can make a response by making an inquiry to a transmitter of the print data.

The printer controller may further include: a second storage unit that stores an address associated with authentication information; and a second message transmitting unit that transmits a second message to an address associated with the authentication information selected by the selecting unit when the first transmitting unit transmits the authentication information selected by the selecting unit. In this case, it is possible to transmit the second message to a person, who is permitted to print when printing is enabled by inputting the data corresponding to the authentication information, in order to inform the person of the same.

When a plurality of printers may be connected to the network, the printer controller may further include a third storage unit that stores authentication information associated with at least one printer selected from among the plurality of printers. The first transmitting unit may transmit the authentication information only to the printer associated with the authentication information, among the plurality of printers. In this case, printing an image based on the print data can be carried out by the printer to which the authentication information is transmitted, that is, by the printer associated with the authentication information. Therefore, in this case, a person permitted to print the image based on the print data can carry out printing by only the printer registered for himself, wherein it is possible to further favorably prevent the print data from leaking.

The selecting unit may select the authentication information from a list including the plurality of authentication information registered therein. In this case, the selecting work can be made further easier.

A computer program product is embodied on computer readable medium. When executed by a computer, the computer program product causes the computer to perform operations including: selecting authentication information from among a plurality of authentication information; transmitting the selected authentication information to a printer connected to the computer via a network; and transmitting print data to be printed to the printer. The selected authentication information is used for authentication for allowing the printer to print an image based on the print data.

A printer that communicates with a printer controller includes: a first receiving unit that receives authentication information from the printer controller; a transmitting unit that transmits, to the printer controller, a first information indicating that data corresponding to the authentication information transmitted from the printer controller is inputted; a second receiving unit that receives print data from the printer controller; and a printing unit that prints an image on a recording medium based on the print data received by the second receiving unit.

According to the above configuration, it is possible to smoothly carry out printing by the printer controller of such a type of transmitting the print data to the printer where the information indicating that data corresponding to the authentication information is inputted is received from the printer.

A printer controller includes: a storage unit that stores print data; a display controller that controls a display to display a plurality of user information; a selecting unit that selects at least one user information from among the plurality of user information displayed on the display; an acquiring unit that acquires authentication information and printer information which are associated with each of the selected user information, each of the printer information indicating at least one printer; and a communication unit that transmits the authentication information associated with the selected user information to the printer indicated by the printer information associated with the selected user information, receives a print data request from a printer in response to the authentication information transmitted, and transmits the print data stored in the storage unit to the printer from which the print data request is received.

A system includes the printer controller as described above, and the printer as described above.

What is claimed is:

1. A printer controller comprising:
   operation unit configured to receive selections of authentication information of a plurality of users from among authentication information;
   a processing unit;
   memory having executable instructions stored thereon that, when executed by the processing unit, cause the processing unit to operate as
      an associating unit that associates the received authentication information of the plurality of users with a single print job;
      a first transmitting unit that transmits the received authentication information for each of the plurality of users associated with the print job to a printer corresponding to a respective one of the authentication information of one of the plurality of users and connected to the printer controller, via a network; and
      a second transmitting unit that transmits print data associated with the print job to the printer,
   wherein the received authentication information for each of the plurality of users is used for authentication for allowing the printer to print an image based on the print data.

2. The printer controller according to claim 1, wherein the memory further has executable instructions stored thereon that, when executed by the processing unit, cause the processing unit to operate as a receiving unit that receives first information from the printer,
   wherein the first information indicates that data corresponding to the authentication information transmitted from the first transmitting unit has been inputted, and
   wherein the second transmitting unit transmits the print data to the printer when the receiving unit receives the first information.

3. The printer controller according to claim 2, further comprising:
   a first storage unit that stores the print data to be transmitted by the second transmitting unit; and
   wherein the memory further has executable instructions stored thereon that, when executed by the processing unit, cause the processing unit to operate as a deleting unit that deletes the print data from the first storage unit when the receiving unit receives first information with respect to all of the authentication information of the plurality of users transmitted from the first transmitting unit.

4. The printer controller according to claim 2, further comprising:
   a first storage unit that stores the print data to be transmitted by the second transmitting unit; and
   wherein the memory further has executable instructions stored thereon that, when executed by the processing unit, cause the processing unit to operate as a deleting unit that deletes the print data from the first storage unit after the receiving unit receives the first information with respect to the authentication information of the plurality of users.

5. The printer controller according to claim 2, further comprising:
   a first storage unit that stores the print data to be transmitted by the second transmitting unit; and
   wherein the memory further has executable instructions stored thereon that, when executed by the processing unit, cause the processing unit to operate as a deleting unit that deletes the print data from the first storage unit when a predetermined time has elapsed after the first transmitting unit transmits the authentication information of the plurality of users.

6. The printer controller according to claim 5, further comprising:
   a second storage unit that stores an address associated with authentication information of one of the plurality of users; and
   wherein the memory further has executable instructions stored thereon that, when executed by the processing unit, cause the processing unit to operate as a message transmitting unit that, when the predetermined time has elapsed after the first transmitting unit transmits the authentication information of the plurality of users and when the receiving unit has not yet received the first information from the printer, transmits a message to an address associated with the authentication information of the plurality of users transmitted to the printer from which the receiving unit has not yet received the first information.

7. The printer controller according to claim 1, further comprising:
   a storage unit that stores an address associated with authentication information of one of the plurality of users; and
   wherein the memory further has executable instructions stored thereon that, when executed by the processing unit, cause the processing unit to operate as a message transmitting unit that transmits a message to an address associated with the authentication information of the plurality of users received by the operation unit when the first transmitting unit transmits the authentication information of the plurality of users received by the operation unit to the printer.

8. The printer controller according to claim 1,
   wherein a plurality of printers are connected to the network,
   the printer controller further comprising a storage unit that stores authentication information of one of the plurality of users associated with at least one printer selected from among the plurality of printers,
   wherein the first transmitting unit transmits the authentication information of the plurality of users received by the operation unit only to the printer associated with the authentication information of the one of the plurality of users, among the plurality of printers.

9. The printer controller according to claim 1,
wherein a plurality of printers are connected to the network,
the printer controller further comprising a storage unit that stores the authentication information of the plurality of users, the authentication information for each of the plurality of users associated with at least one printer selected from among the plurality of printers,
wherein the first transmitting unit transmits authentication information of at least one of the users received by the operation unit only to the printer associated with the received authentication information of at least one of the users, among the plurality of printers.

10. The printer controller according to claim 1, wherein the operation unit receives the selection of the authentication information from a list including the plurality of authentication information of the plurality of users registered therein.

11. A non-transitory computer readable medium having executable instructions stored thereon, which when executed by a computer, cause the computer to perform operations comprising:
receiving selections of authentication information of a plurality of users from among authentication information;
associating the received authentication information of the plurality of users with a single print job;
transmitting the received authentication information for each of the plurality of users associated with the print job to a printer corresponding to respective one of the authentication information of one of the plurality of user and connected to the computer via a network; and
transmitting print data associated with the print job to the printer,
wherein the received authentication information for each of the plurality of users is used for authentication for allowing the printer to print an image based on the print data.

12. A printer controller comprising:
a storage unit that stores print data;
a display configured to display user information for a plurality of users;
an operation unit configured to receive selections of user information of a plurality of users from among the plurality of user information displayed on the display;
a processing unit;
memory having executable instructions stored thereon that, when executed by the processing unit, cause the processing unit to operate as
a display controller that controls the display to display the user information;
an associating unit that associates the received user information of the plurality of users with a single print job;
an acquiring unit that acquires an authentication information and printer information which are associated with the received user information for each of the plurality of users, each of the printer information indicating at least one printer; and
a communication unit that
transmits the authentication information associated with the received user information for each of the plurality of users associated with the print job to the at least one printer indicated by the printer information associated with the received user information for each of the plurality of users,
receives a print data request which is transmitted from a printer in response to the transmitted authentication information associated with the print job, and
transmits the print data associated with the print job and stored in the storage unit to the printer from which the print data request is received.

13. The printer controller according to claim 12,
wherein the storage unit further stores the plurality of user information, and
wherein the user information is associated with the authentication information and the printer information for a plurality of users.

14. The printer controller according to claim 12, wherein the acquiring unit that acquires, from a server, the authentication information and the printer information which are associated with respective user information received by the operation unit.

15. The printer controller according to claim 12,
wherein acquiring unit further acquires an address associated with each of the received user information of the plurality of users, and
wherein the communication unit transmits a message indicating that the communication unit transmits the authentication information to the printer associated with the received user information of the plurality of users, to the address associated with the received user information of the plurality of users.

16. A system comprising:
a printer controller; and
a printer connected to the printer controller via a network,
wherein the printer controller comprises:
an operation unit that receives selections of authentication information of a plurality of users from among authentication information;
a processing unit;
memory having executable instructions stored thereon that, when executed by the processing unit, cause the processing unit to operate as
an associating unit that associates the received authentication information of the plurality of users with a single print job;
a first transmitting unit that transmits the received authentication information for each of the plurality of users associated with the print job to the printer corresponding to a respective one of the authentication information of one of the plurality of users; and
a second transmitting unit that transmits print data associated with the print job to the printer,
wherein the received authentication information for each of the plurality of users is used for authentication for allowing the printer to print an image based on the print data
wherein the printer comprises:
a processing unit;
memory having executable instructions stored thereon that, when executed by the processing unit of the printer, cause the processing unit of the printer as
a first receiving unit that receives the authentication information of the plurality of users transmitted from the first transmitting unit of the printer controller;
a transmitting unit that transmits first information indicating that data corresponding to the authentication information of the plurality of users transmitted from the first transmitting unit of the printer controller has been inputted; and a second receiving unit that receives the print data transmitted from the second transmitting unit of the printer controller; and a printing unit that prints the image on a recording medium based on the print data received by the second receiving unit.

17. The system according to claim 16, wherein the memory of the printer controller further has executable instructions stored thereon that, when executed by the processing unit of the printer controller, cause the processing unit of the printer controller to operate as a receiving unit that receives the first information transmitted from the transmitting unit of the printer, and wherein the second transmitting unit of the printer controller transmits the print data to the printer when the receiving unit of the printer controller receives the first information.

18. The system according to claim 17, wherein the printer controller further comprises:

a first storage unit that stores the print data to be transmitted by the second transmitting unit of the printer controller; and wherein the memory of the printer controller further has executable instructions stored thereon that, when executed by the processing unit of the printer controller, cause the processing unit of the printer controller to operate as a deleting unit that deletes the print data from the first storage unit when the receiving unit of the printer controller receives first information with respect to all of the authentication information of the plurality of users transmitted from the first transmitting unit of the printer controller.

19. The system according to claim 17, wherein the printer controller further comprises:

a first storage unit that stores the print data to be transmitted by the second transmitting unit of the printer controller; and wherein the memory of the printer controller further has executable instructions stored thereon that, when executed by the processing unit of the printer controller, cause the processing unit of the printer controller to operate as a deleting unit that deletes the print data from the first storage unit after the receiving unit of the printer controller receives the first information with respect to the authentication information of the plurality of users transmitted from the first transmitting unit of the printer controller.

20. The system according to claim 17, wherein the printer controller further comprises:

a first storage unit that stores the print data to be transmitted by the second transmitting unit of the printer controller; and wherein the memory of the printer controller further has executable instructions stored thereon that, when executed by the processing unit of the printer controller, cause the processing unit of the printer controller to operate as a deleting unit that deletes the print data from the first storage unit when a predetermined time has elapsed after the first transmitting unit of the printer controller transmits the authentication information of the plurality of users.

21. The system according to claim 20, wherein the printer controller further comprises:

a second storage unit that stores an address associated with authentication information of one of the plurality of users; and wherein the memory of the printer controller further has executable instructions stored thereon that, when executed by the processing unit of the printer controller, cause the processing unit of the printer controller to operate as a message transmitting unit that, when the predetermined time has elapsed after the first transmitting unit of the printer controller transmits the authentication information of the plurality of users and when the receiving unit of the printer controller has not yet received the first information from the printer, transmits a message to an address associated with the authentication information of the plurality of users transmitted to the printer from which the receiving unit of the printer controller has not yet received the first information.

22. The system according to claim 16, wherein the printer controller further comprises:

a storage unit that stores an address associated with authentication information of one of the plurality of users; and wherein the memory of the printer controller further has executable instructions stored thereon that, when executed by the processing unit of the printer controller, cause the processing unit of the printer controller to operate as a message transmitting unit that transmits a second message to an address associated with the authentication information of the plurality of users received by the operation unit when the first transmitting unit of the printer controller transmits the authentication information of the plurality of users received by the operation unit to the printer.

23. The system according to claim 16, wherein a plurality of printers are connected to the network, wherein the printer controller further comprises a storage that stores authentication information of one of the plurality of users associated with at least one printer selected from among the plurality of printers, and wherein the first transmitting unit of the printer controller transmits the authentication information of the plurality of users received by the operation unit only to the printer associated with the authentication information of the one of plurality of users, among the plurality of printers.

24. The system according to claim 16, wherein the operation unit receives the selections of the authentication information of the plurality of users from a list including the authentication information of the plurality of users registered therein.

* * * * *

UNITED STATES PATENT AND TRADEMARK OFFICE
CERTIFICATE OF CORRECTION

PATENT NO. : 8,107,102 B2
APPLICATION NO. : 11/925087
DATED : January 31, 2012
INVENTOR(S) : Norimichi Funahashi It is certified that error appears in the above-identified patent and that said Letters Patent is hereby corrected as shown below:

Column 12, Claim 16, Line 58:
Please delete "printer as" and insert -- printer to operate as --

Signed and Sealed this
Twelfth Day of June, 2012

David J. Kappos
*Director of the United States Patent and Trademark Office*